(12) United States Patent
Sato et al.

(10) Patent No.: US 12,214,406 B2
(45) Date of Patent: Feb. 4, 2025

(54) UPPER TOOL STOCKER

(71) Applicant: Amada Co., Ltd., Kanagawa (JP)

(72) Inventors: Masaaki Sato, Kanagawa (JP); Shiro Hayashi, Kanagawa (JP); Shingo Kamada, Kanagawa (JP); Hideto Yamada, Kanagawa (JP); Yohei Yamaguchi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 462 days.

(21) Appl. No.: 17/259,226

(22) PCT Filed: Jul. 17, 2019

(86) PCT No.: PCT/JP2019/028035
§ 371 (c)(1),
(2) Date: Jan. 11, 2021

(87) PCT Pub. No.: WO2020/017540
PCT Pub. Date: Jan. 23, 2020

(65) Prior Publication Data
US 2021/0252582 A1 Aug. 19, 2021

(30) Foreign Application Priority Data

Jul. 17, 2018 (JP) .................................. 2018-134151
Jul. 17, 2018 (JP) .................................. 2018-134168
(Continued)

(51) Int. Cl.
*B21D 5/02* (2006.01)
*B21D 37/04* (2006.01)
(Continued)

(52) U.S. Cl.
CPC ............. *B21D 5/0254* (2013.01); *B21D 5/02* (2013.01); *B21D 5/0209* (2013.01);
(Continued)

(58) Field of Classification Search
CPC ........ Y10T 483/1729; Y10T 483/1731; B21D 5/0254; B21D 37/145
(Continued)

(56) References Cited

U.S. PATENT DOCUMENTS 3,779,155 A * 12/1973 Ohno .................... B30B 15/146
100/207
5,168,745 A * 12/1992 Miyagawa ........... B21D 5/0218
72/389.4
(Continued)

FOREIGN PATENT DOCUMENTS

AT 515407 B1 * 9/2015 ............... B21D 5/02
CN 101081478 A 12/2007
(Continued)

OTHER PUBLICATIONS

International Search Report for corresponding Application No. PCT/JP2019/028035, mailed Oct. 21, 2019.
(Continued)

*Primary Examiner* — Erica E Cadugan
*Assistant Examiner* — Michael Vitale
(74) *Attorney, Agent, or Firm* — Renner, Otto, Boisselle & Sklar, LLP

(57) ABSTRACT

An upper tool stocker for detachably supporting a plurality of divided upper tools in a press brake includes a stocker main body extending in a left-right direction, and provided with a left-right directional installing groove, attachment portions provided in upper portions of the divided upper tools being detachably installed in the installing groove, wherein the stocker main body includes a front-back directional cutout communicated with the installing groove to remove the divided upper tools downward or in the front-back direction from the installing groove.

8 Claims, 14 Drawing Sheets

(30) Foreign Application Priority Data

| Jul. 27, 2018 | (JP) | 2018-140886 |
| Sep. 11, 2018 | (JP) | 2018-169366 |
| May 7, 2019 | (JP) | 2019-087437 |
| May 16, 2019 | (JP) | 2019-092892 |
| Jun. 12, 2019 | (JP) | 2019-109717 |
| Jun. 14, 2019 | (JP) | 2019-111277 |
| Jul. 8, 2019 | (JP) | 2019-126935 |

(51) Int. Cl.
 *B21D 37/14* (2006.01)
 *B23Q 3/155* (2006.01)

(52) U.S. Cl.
 CPC .......... *B21D 5/0236* (2013.01); *B21D 37/04* (2013.01); *B21D 37/145* (2013.01); *Y10T 483/1731* (2015.01); *Y10T 483/18* (2015.01)

(58) Field of Classification Search
 USPC ..................................................... 483/28, 29
 See application file for complete search history.

(56) References Cited

U.S. PATENT DOCUMENTS

| 6,024,681 | A | * | 2/2000 | Latten | B30B 15/028 |
| | | | | | 483/68 |
| 6,467,327 | B1 | * | 10/2002 | Runk | B21D 5/0236 |
| | | | | | 72/481.1 |
| 7,168,286 | B1 | | 1/2007 | Pelech | |
| 7,632,224 | B2 | | 12/2009 | Rouweler et al. | |
| 7,634,935 | B2 | * | 12/2009 | Mazzocchi | B21D 5/0209 |
| | | | | | 72/481.6 |
| 7,901,341 | B2 | * | 3/2011 | Shimizu | B21D 37/145 |
| | | | | | 72/478 |
| 8,141,408 | B2 | * | 3/2012 | McCauley | B21D 37/145 |
| | | | | | 72/466.8 |
| 9,975,161 | B2 | * | 5/2018 | Sato | B21D 5/004 |
| 10,500,623 | B2 | | 12/2019 | Meneghetti | |
| 2003/0064871 | A1 | | 4/2003 | Akami | |
| 2003/0069114 | A1 | | 4/2003 | Akami | |
| 2003/0092547 | A1 | | 5/2003 | Akami | |
| 2004/0157715 | A1 | | 8/2004 | Akami | |
| 2007/0271987 | A1 | | 11/2007 | Shimizu et al. | |
| 2007/0297889 | A1 | | 12/2007 | Rouweler et al. | |
| 2009/0100896 | A1 | | 4/2009 | Akami | |
| 2014/0326036 | A1 | | 11/2014 | Hayashi | |
| 2015/0174633 | A1 | | 6/2015 | Sato | |
| 2016/0354821 | A1 | | 12/2016 | Meneghetti | |
| 2017/0297073 | A1 | | 10/2017 | Sato | |
| 2017/0312800 | A1 | * | 11/2017 | Fischereder | B21D 5/0281 |
| 2018/0133774 | A1 | * | 5/2018 | Hilton | B30B 1/00 |

FOREIGN PATENT DOCUMENTS

| CN | 105992658 | A | | 10/2016 | |
| CN | 106 734 644 | A | | 5/2017 | |
| DE | 100 60 405 | B4 | | 3/2007 | |
| EP | 1 160 024 | A1 | | 12/2001 | |
| EP | 1862255 | A1 | | 12/2007 | |
| JP | S58 76326 | U | | 5/1983 | |
| JP | 02251322 | A | * | 10/1990 | ............ B21D 37/04 |
| JP | H09 220618 | A | | 8/1997 | |
| JP | H10211521 | A | | 8/1998 | |
| JP | H10263708 | A | | 10/1998 | |
| JP | H110235 | A | | 1/1999 | |
| JP | 2000071028 | A | | 3/2000 | |
| JP | 2004337950 | A | | 12/2001 | |
| JP | 2006000855 | A | | 1/2006 | |
| JP | 2006-346707 | A | | 12/2006 | |
| JP | 4672868 | B | | 1/2011 | |
| JP | 2013111610 | A | | 6/2013 | |
| JP | 2014-4604 | A | | 1/2014 | |
| JP | 5841800 | B | | 1/2016 | |
| JP | 2016-83673 | A | | 5/2016 | |
| JP | 2017-508623 | A | | 3/2017 | |
| WO | 2008050458 | A1 | | 5/2008 | |
| WO | 2015118505 | A3 | | 8/2015 | |
| WO | 2016/023057 | A1 | | 2/2016 | |
| WO | 2016/054668 | A1 | | 4/2016 | |
| WO | WO-2017139819 | A1 | * | 8/2017 | ........... B21D 37/145 |
| WO | 2017212386 | A1 | | 12/2017 | |
| WO | 2018065965 | A1 | | 4/2018 | |

OTHER PUBLICATIONS

Written Opinion for corresponding Application No. PCT/JP2019/028035, mailed Oct. 21, 2019.

European Search Report for corresponding Application No. 20805835.4, mailed May 30, 2022.

European Search Report for corresponding Application No. 20802239.2, mailed May 23, 2022.

Extended European Search Report for corresponding EP Application No. 19837570.1, dated Aug. 12, 2021.

Extended European Search Report for corresponding EP Application No. 19837688.1, mailed Aug. 2, 2021.

Extended European Search Report for corresponding EP Application No. 19838058.6, dated Aug. 6, 2021.

Extended European Search Report for corresponding EP Application No. 19838694.8, dated Aug. 6, 2021.

\* cited by examiner

UPPER TOOL STOCKER

TECHNICAL FIELD

The present disclosure relates to an upper tool stocker for detachably supporting a plurality of divided upper tools used for a press brake. More specifically, the present disclosure relates to an upper tool stocker provided with a shutter that prevents dropping of a plurality of divided upper tools detachably supported by a stocker main body of the upper tool stocker.

BACKGROUND ART

When a plate-shaped workpiece is bent in a press brake, for example, in a case where the workpiece has rising portions on both the left and right sides, a plurality of divided upper tools are combined so as not to interfere with the rising portions on both sides, and correspond to a gap between the rising portions on both sides. That is, a plurality of divided upper tools are combined according to the bending line length of a workpiece. Therefore, in the press brake, it is necessary to prepare a plurality of divided upper tools with different width dimensions (length dimensions) in the left-right direction in advance. In addition, in order to correspond to the plate thickness, the bending shape, and the like of the workpiece, a plurality of types of divided upper tools with different shapes are required.

Therefore, a tool storage that stores a plurality of the divided upper tools is provided on one side in the left-right direction of the press brake. A plurality of upper tool stockers detachably supporting the plurality of divided upper tools are provided in the tool storage (see Patent Literatures 1 and 2, for example).

CITATION LIST

Patent Literature

Patent Literature 1: Japanese Patent No. 4672868
Patent Literature 2: Japanese Patent Laid-Open No. 2016-83673

SUMMARY

An upper tool stocker described in each of Patent Literatures 1 and 2 is an upper tool stocker for a divided upper tool that is to be installed and removed by an automatic tool changer (ATC). The aforementioned divided upper tool is provided with left-right directional V-grooves for anti-drop on both front and back surfaces of an attachment portion (shank portion) provided on an upper portion. An installing groove for allowing the divided upper tool to be detachably installed in the upper tool stocker is formed long in the left-right direction over the total length of the stocker. A locking piece that can be engaged with and disengaged from the V-groove for anti-drop is provided long in the left-right direction, in the installing groove. The upper tool stocker is provided with an actuator for operating the locking piece. The installing groove is configured as a groove with a certain width.

Therefore, in the upper tool stocker described in each of Patent Literatures 1 and 2, for example, a divided upper tool that is manually installed to and removed from an upper tool holder described in Japanese Patent No. 5841800 (hereinafter, simply referred to as Patent Gazette) cannot be supported. That is, the upper tool holder described in the Patent Gazette or the like is provided with an upper tool clamp in a closable manner, the upper tool clamp being capable of clamping the divided upper tool between an upper tool supporting portion provided in the upper tool holder, and the upper tool clamp.

In the divided upper tool, one side surface (a front surface or a back surface) of the attachment portion clamped by the upper tool supporting portion and the upper tool clamp is formed as a vertical contact surface that is in surface contact with the upper tool supporting portion. On the back surface of this contact surface (opposite surface, other side surface), a left-right directional engaging groove that engages with an anti-drop piece provided in the upper tool clamp is formed.

Therefore, the upper tool installed to and removed from the upper tool stocker described in each of Patent Literatures 1 and 2, and the divided upper tool installed to and removed from the upper tool holder described in the Patent Gazette or the like are not compatible with each other, and an automatic tool changer cannot be used.

Therefore, the present invention provides an upper tool stocker for detachably supporting the aforementioned divided upper tool by an automatic tool changer in a case where the divided upper tool is installed to and removed from the upper tool holder described in the Patent Gazette or the like, by the automatic tool changer.

According to a first aspect of one or more embodiments, there is provided an upper tool stocker for detachably supporting a plurality of divided upper tools in a press brake, the upper tool stocker including: a stocker main body provided with a left-right directional installing groove, attachment portions provided in upper portions of the divided upper tools being detachably installed in the installing groove; and a plurality of locking pieces configured to be movable in a direction intersecting a longitudinal direction of the installing groove, and to fix the divided upper tools to the installing groove, wherein the stocker main body is provided with a shutter configured to regulate movement of the locking pieces at the same time, and to release movement regulation of the locking pieces at the same time.

According to a second aspect of one or more embodiments, there is provided an upper tool stocker for detachably supporting a plurality of divided upper tools in a press brake, the upper tool stocker including a stocker main body extending in a left-right direction, and provided with a left-right directional installing groove, attachment portions provided in upper portions of the divided upper tools being detachably installed in the installing groove, wherein the stocker main body includes a front-back directional cutout communicated with the installing groove to remove the divided upper tools downward or in the front-back direction from the installing groove.

According to an upper tool stocker of one or more embodiments, for example, a plurality of the divided upper tools installed to and removed from the upper tool holder described in Japanese Patent No. 5841800 can be installed to the upper tool stocker. Therefore, manual exchange of the divided upper tools with respect to the upper tool holders described in the aforementioned Patent Gazette and exchange by using the automatic tool changer is possible. Accordingly, the versatility of installing and removing of the divided upper tools is improved.

In addition, the stocker main body of the upper tool stocker is provided with a shutter. Therefore, the divided upper tool does not accidentally drop when the stocker main body is moved, and safety is improved.

DESCRIPTION OF EMBODIMENT

An embodiment of the present invention will be hereinafter described using the drawings. First, in order to facilitate understanding, relationship between a press brake and a tool storage that stores a tool to be exchanged will be described.

Figure 1:
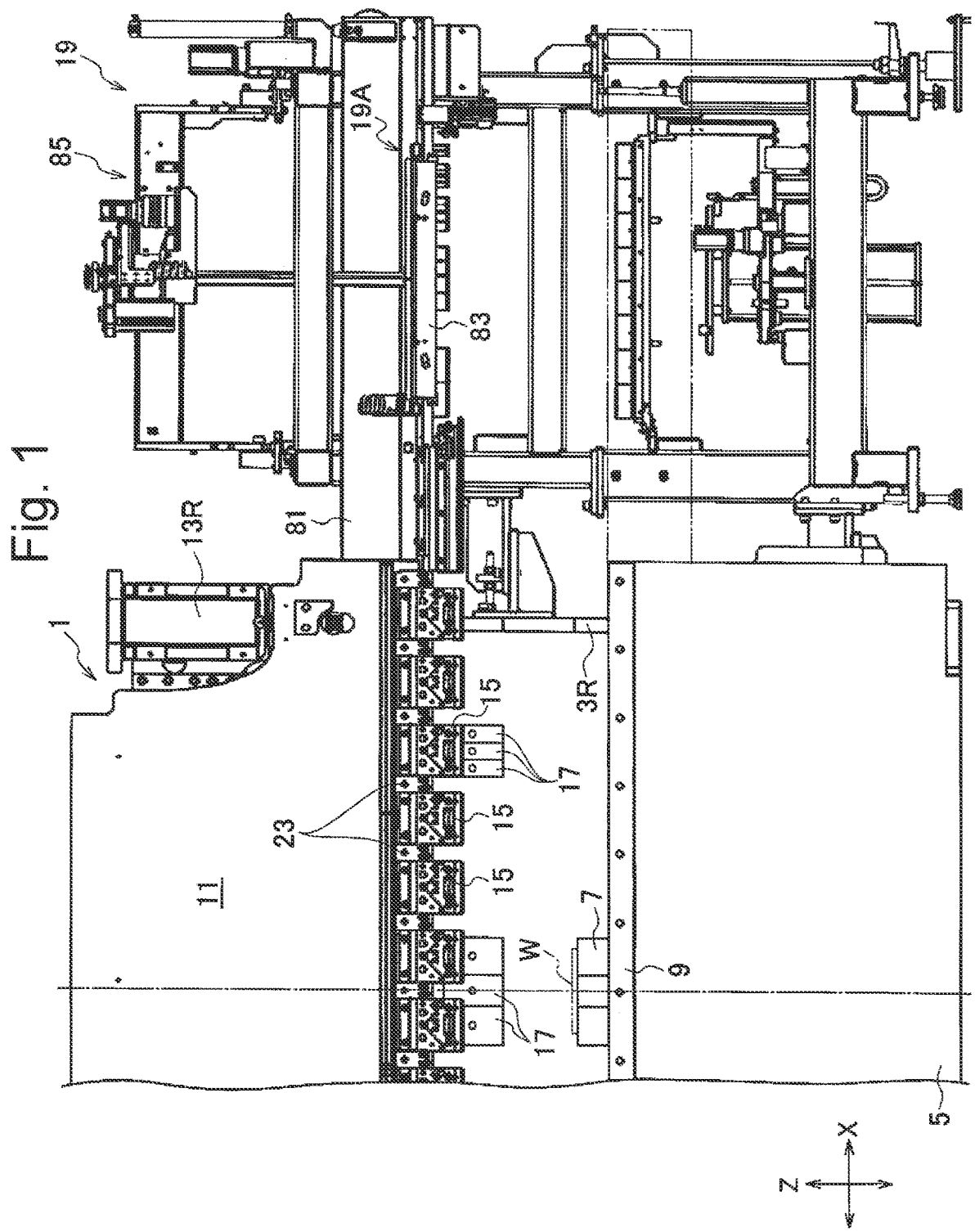
FIG. 1 is a frontal explanatory view illustrating relationship between a press brake and a tool storage according to an embodiment of the present invention.

The configuration of the press brake is well known. Roughly illustrating, the press brake 1 is configured symmetrically as illustrated in FIG. 1, and in FIG. 1, the configuration on the left side of the press brake is omitted. In FIG. 1, the press brake 1 has a C-shaped right side frame 3R. A lower table 5 is integrally attached to a lower portion on the front side of the side frame 3R. A lower tool installing portion 9 that allows a divided lower tool 7 to be detachably installed is provided on an upper portion of this lower table 5.

The upper table 11 vertically facing the lower table 5 is provided on an upper portion on the front side of the side frame 3R movably in the vertical direction. In order to move the upper table 11 vertically, for example, a right vertical motion actuator 13R such as a hydraulic cylinder and a servo motor is provided on the upper portion of the side frame 3R.

A plurality of upper tool holders 15 that are spaced at appropriate intervals in the left-right direction (X-axis direction) are provided in the lower portion of the upper table 11. The upper tool holders 15 each have a function of detachably holding the divided upper tool 17. The configuration of each upper tool holder 15 is the same as the configuration of the upper tool holder described in patent publication. Therefore, the details of the upper tool holders 15 will be omitted.

With the above configuration, a plate-shaped workpiece W is placed and positioned on the divided lower tool 7 installed to the lower table 5. Then, by lowering the upper table 11, the divided lower tool 7 and the divided upper tools 17 work together to bend the workpiece W.

A tool storage 19 that stores the divided lower tools 7 installed to and removed from the lower tool installing portion 9 and the divided upper tools 17 installed to and removed from the upper tool holders 15 is provided close to one side in the left-right direction of the press brake 1. A lower tool changer (not illustrated in FIG. 1) for installing and removing of each divided lower tool 7 between the press brake 1 and the tool storage 19, and an upper tool changer (ATC) 20 (see FIG. 2) for installing and removing of each divided upper tool 17 are provided.

More specifically, a guide rail 21 elongated in the left-right direction (X-axis direction) is provided on the back side of the upper table 11 (on the right side in FIG. 2) in order to install and remove the divided upper tools 17 to and from the upper tool holders 15.

That is, a plurality of girder members 23 that protrudes backward (right direction in FIG. 2) are provided between the upper tool holders 15 provided to be appropriately spaced in the X-axis direction (left-right direction) and in the lower portion of the upper table 11. A beam member 25 extended in the left-right direction (X-axis direction) is horizontally provided at a tip (back end) of each girder member 23. A rack 27 elongated in the X-axis direction is provided on a lower surface of the above beam member 25. This rack 27 is provided with the guide rail 21 in the X-axis direction.

A box-shaped first slider 31 as a moving member is movably supported on the guide rail 21 via linear sliders 29. In order to move the first slider 31 in the X-axis direction and position the first slider 31, the first slider 31 is provided with a servo motor 33. A pinion gear 35 (see FIG. 3, and the rack 27 and the guide rail 21 are not illustrated in FIG. 3) that is rotationally driven by this servo motor 33 meshes with the rack 27. Therefore, by the rotation of the servo motor 33, the first slider 31 is reciprocated in the X-axis direction and is positioned at a desired position.

The guide rail 21, the beam member 25, and the rack 27 extend long over the inside of the tool storage 19. Therefore, the slider 31 can reciprocate in the X-axis direction from the back side of the press brake 1 to the inside of the tool storage 19.

A base plate 37 (see FIG. 3) is vertically integrated on one side in the X-axis direction of the first slider 31. A second slider 41 is supported on a Y-axis directional guide member 39 provided on this base plate 37 movably in the Y-axis direction. The second slider 41 is provided with a reciprocating device 43 in order to move the second slider 41 in the Y-axis direction.

Various configurations can be adopted for this reciprocating device 43. However, in this embodiment, the above reciprocating device 43 is illustrated as a hydraulic cylinder. A tip 43E of a piston rod 43P provided in the reciprocating device 43 so as to freely reciprocate is coupled to a bracket 37A provided so as to be integrally coupled to the base plate 37. Therefore, the second slider 41 can be reciprocated in the Y-axis direction with respect to the base plate 37 by driving the reciprocating device 43.

A third slider 45 is provided in the second slider 41 so as to freely reciprocate in the Y-axis direction via a guide member (not illustrated) in the Y-axis direction. In order to reciprocate this third slider 45, the piston rod 47P provided in the hydraulic cylinder 47 installed to the second slider 41 and serving as a reciprocating device so as to freely reciprocate is coupled to a protrusion 45P provided on the third slider 45. Therefore, the third slider 45 is reciprocated in the Y-axis direction with respect to the second slider 41 by the operation of the hydraulic cylinder 47.

A supporting block 49 is integrally provided on the front side in the front-back direction (Y-axis direction) of the third slider 45. This supporting block 49 includes a rod-shaped finger 53 that protrudes forward (to the left in FIGS. 2 and 3). The rod-shaped finger 53 is freely insertable into a front-back directional through hole 51 provided at a central portion in the left-right direction (X-axis direction) of the divided upper tool 17.

Figure 2:
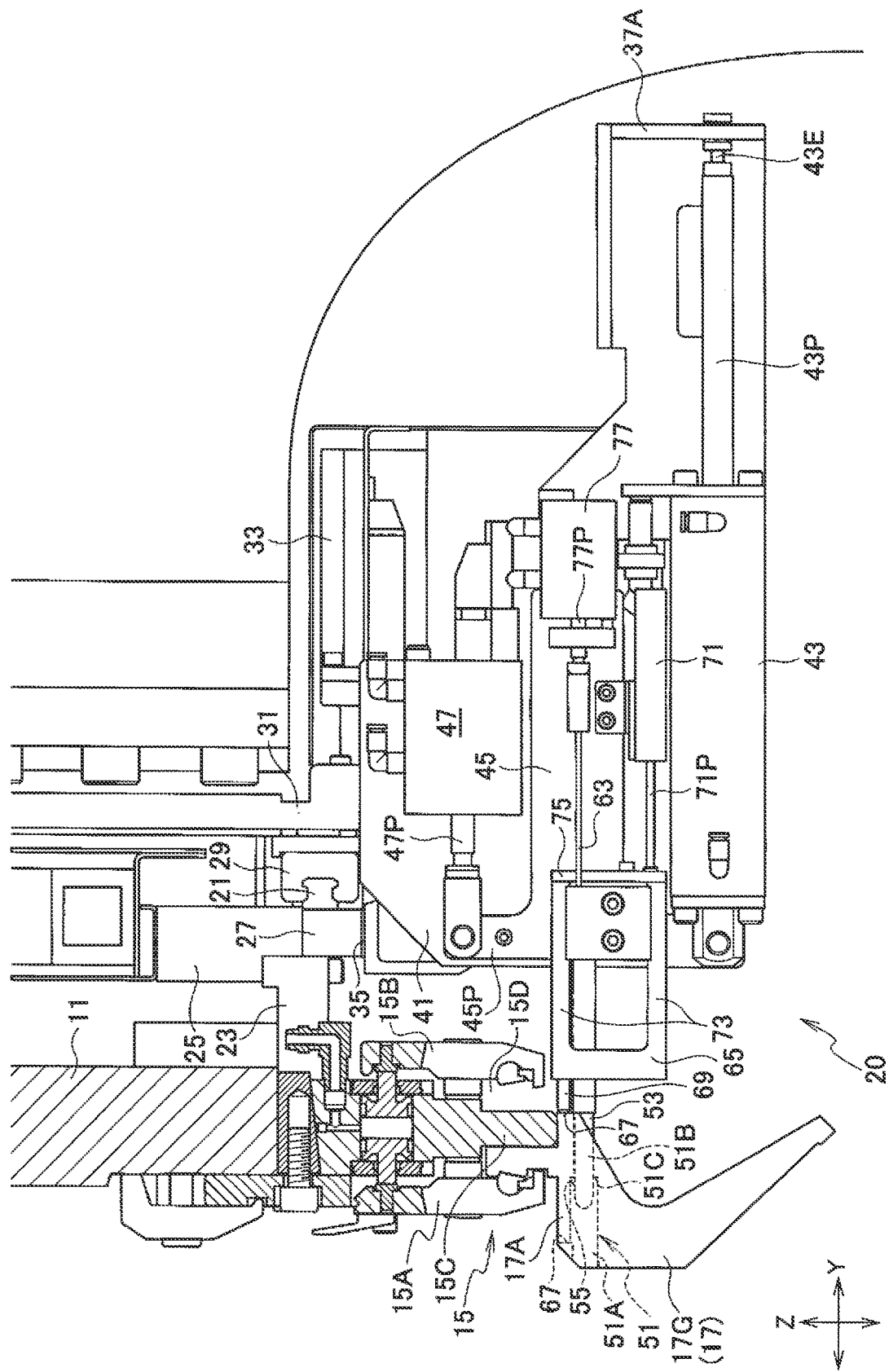
FIG. 2 is an explanatory view of an action when an upper tool is installed to and removed from a tool attachment portion by an ATC.
Figure 3:
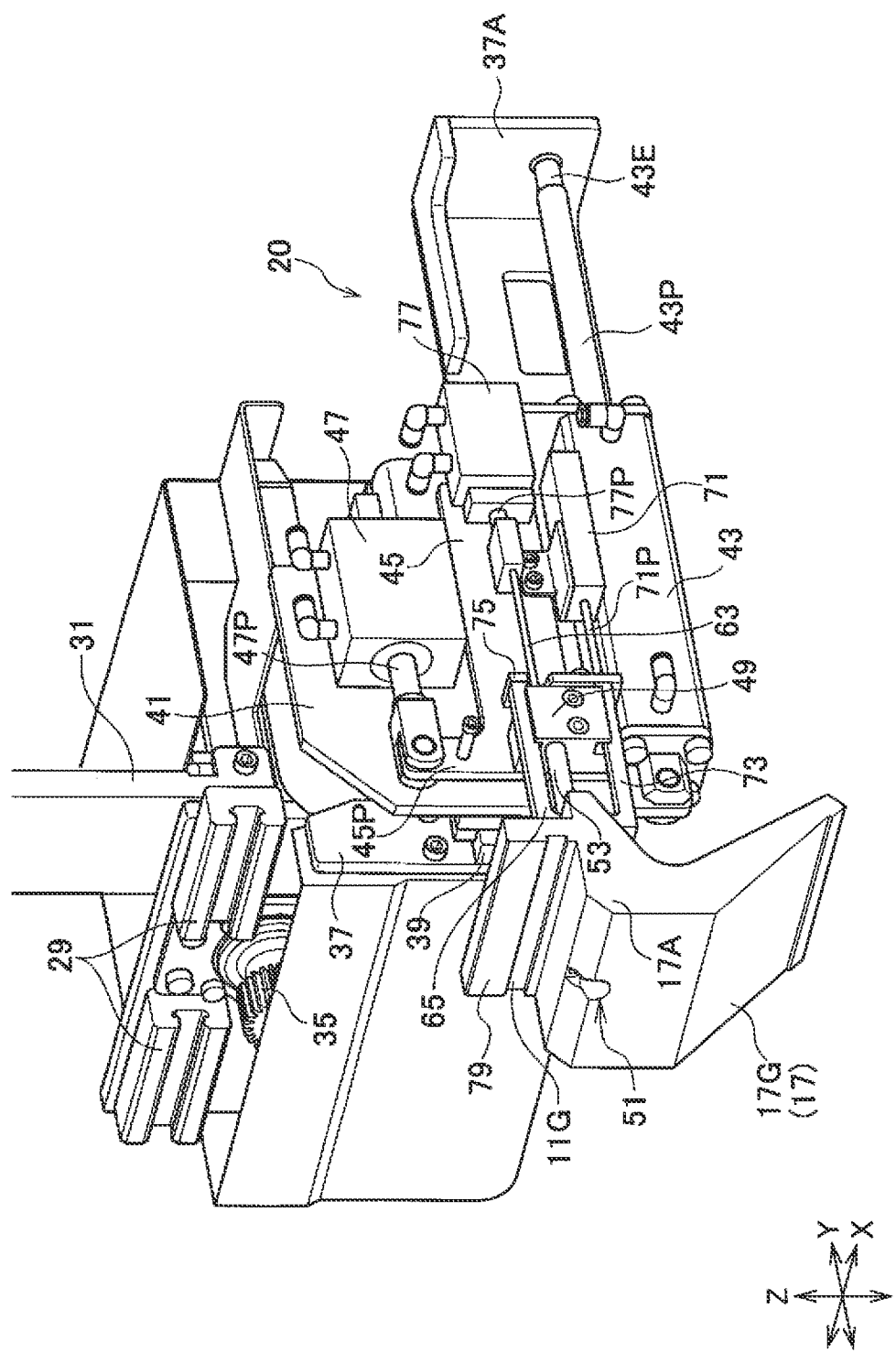
FIG. 3 is a perspective explanatory view illustrating a state in which the upper tool is held by the ATC.

The divided upper tool 17 is illustrated by a gooseneck tool 17G in FIG. 3. A thick portion 17A of the gooseneck tool 17G (see FIG. 2) is formed to be thicker in the front-back direction than a thick portion 17A of a divided upper tool 17 illustrated in FIG. 4. Therefore, as illustrated in FIG. 2, the through hole 51 communicates a large-diameter hole 51A and a small-diameter hole 51B. A stepped portion 51C is formed in a connecting portion between the large-diameter hole 51A and the small-diameter hole 51B.

A locking piece (engagement piece) 55 capable of being protruded from and retracted into an outer circumferential surface on the tip side of the finger 53 is provided on the tip side of the finger 53, in order to support the divided upper tool 17 so as not to cause the divided upper tool 17 to fall when the finger 53 is inserted into the through hole 51 of the divided upper tool 17.

Figure 4:
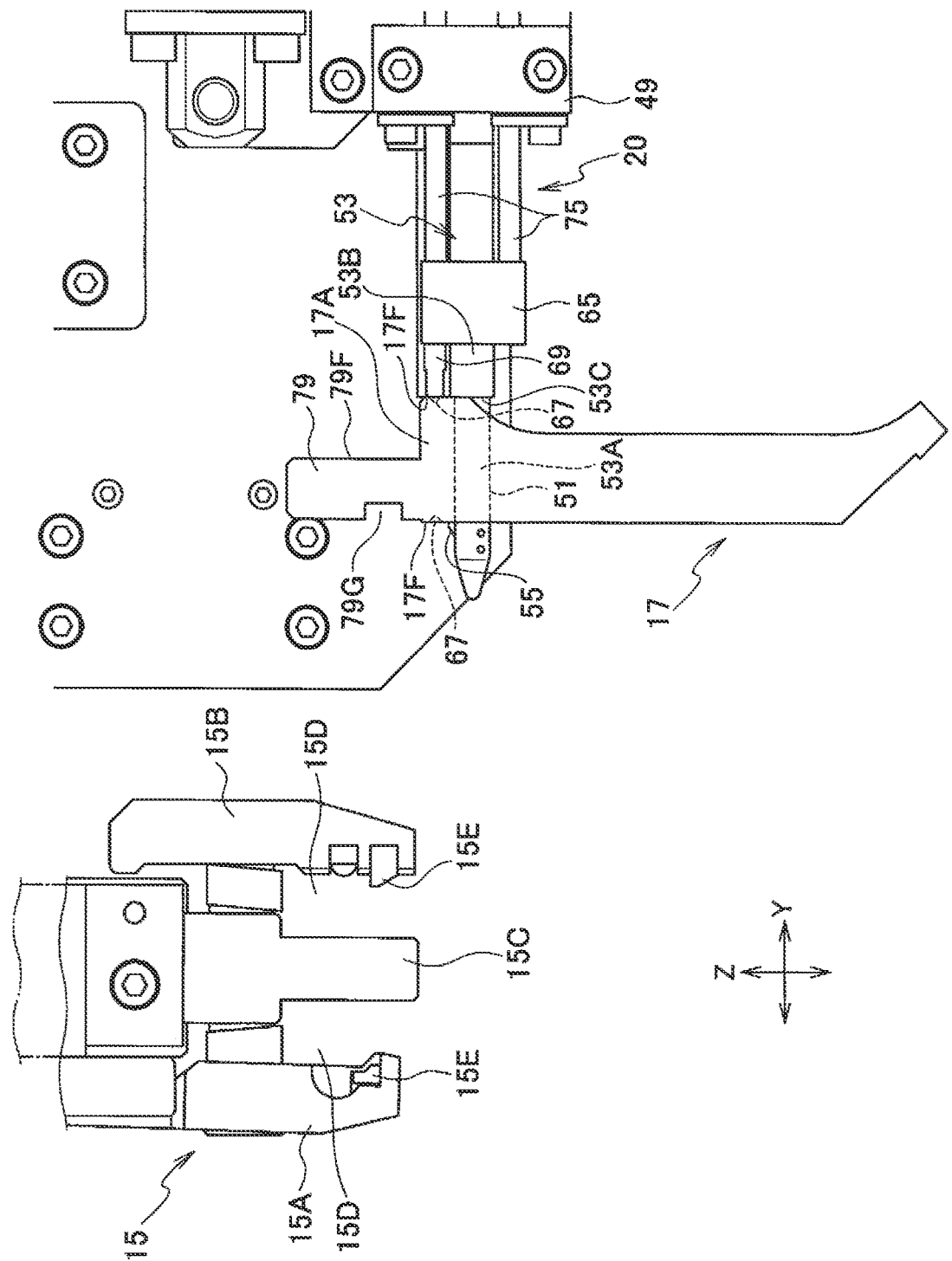
FIG. 4 is an explanatory view of an action when the upper tool is installed to and removed from the tool attachment portion by the ATC.

That is, the finger 53 includes a small-diameter portion 53A that is freely insertable into the through hole 51 and located on the tip side and a large-diameter portion 53B on the base end side as illustrated in FIG. 4. A stepped portion 53C is formed between the small-diameter portion 53A and the large-diameter portion 53B.

This stepped portion 53C is configured to abut on front and back surfaces 17F of the thick portion 17A of the divided upper tool 17 when the small-diameter portion 53A is inserted into the through hole 51 of the divided upper tool 17. The stepped portion 53C abuts on the front surface 17F of the thick portion 17A in a case where the finger 53 is inserted into the through hole 51 from the front side, and the stepped portion 53C abuts on the back surface 17F of the thick portion 17A in a case where the finger 53 is inserted into the through hole 51 from the back side.

Figure 5:
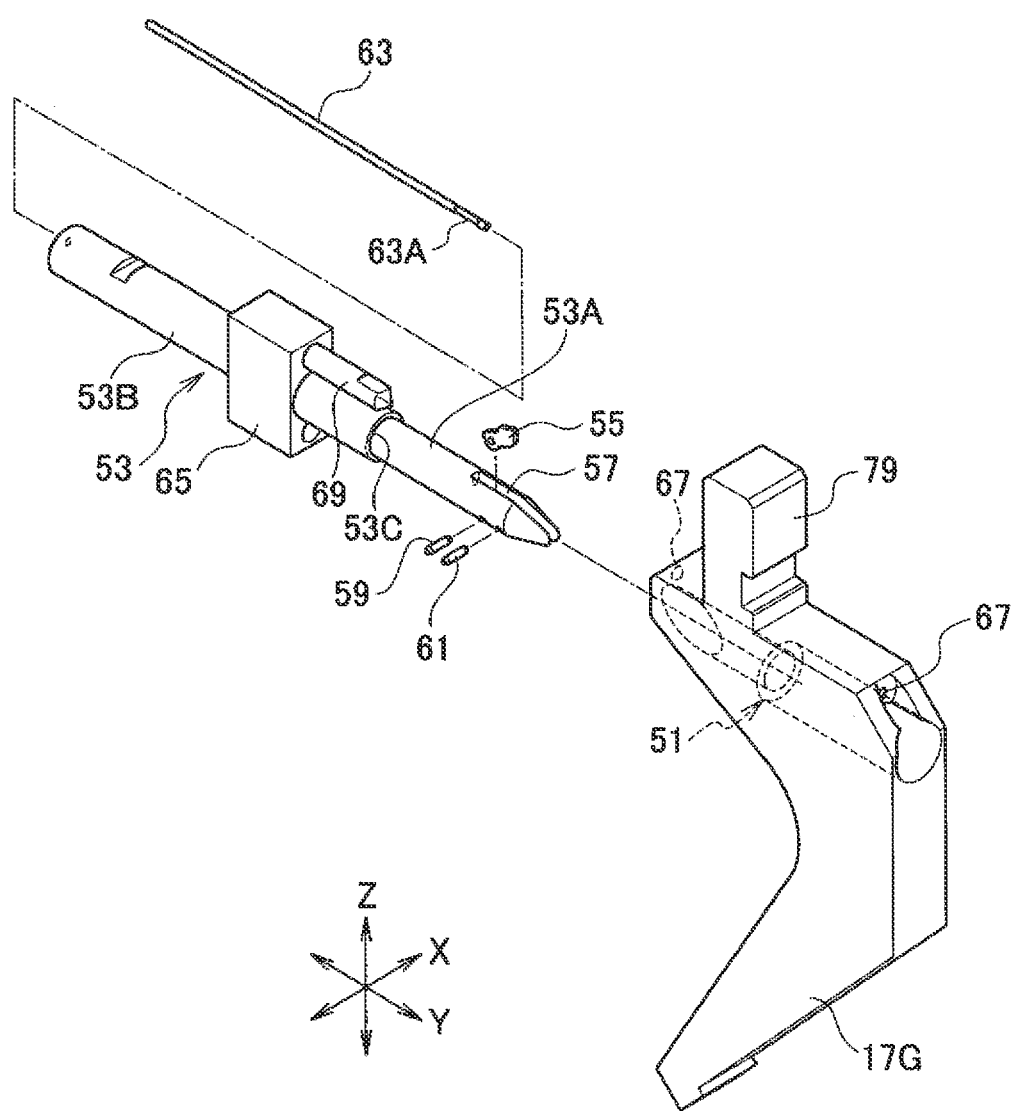
FIG. 5 is an explanatory view illustrating relationship between a finger and the upper tool in the ATC.

More specifically, as illustrated in FIG. 5, a slit 57 is formed on the tip side of the finger 53. A locking piece 55 is vertically rotatably provided in this slit 57 via a pivot pin 59 orthogonal to the longitudinal direction of the finger 53. The slit 57 is provided with a stopper 61 that limits immersion of the locking piece 55 with respect to an outer circumferential surface of the finger 53. In order to protrude/retract the locking piece 55 on the outer circumferential surface of the finger 53, the finger 53 is provided with an operating rod 63 such that the operating rod 63 is movable in the longitudinal direction (the Y-axis direction, the front-back direction).

Figure 6A:
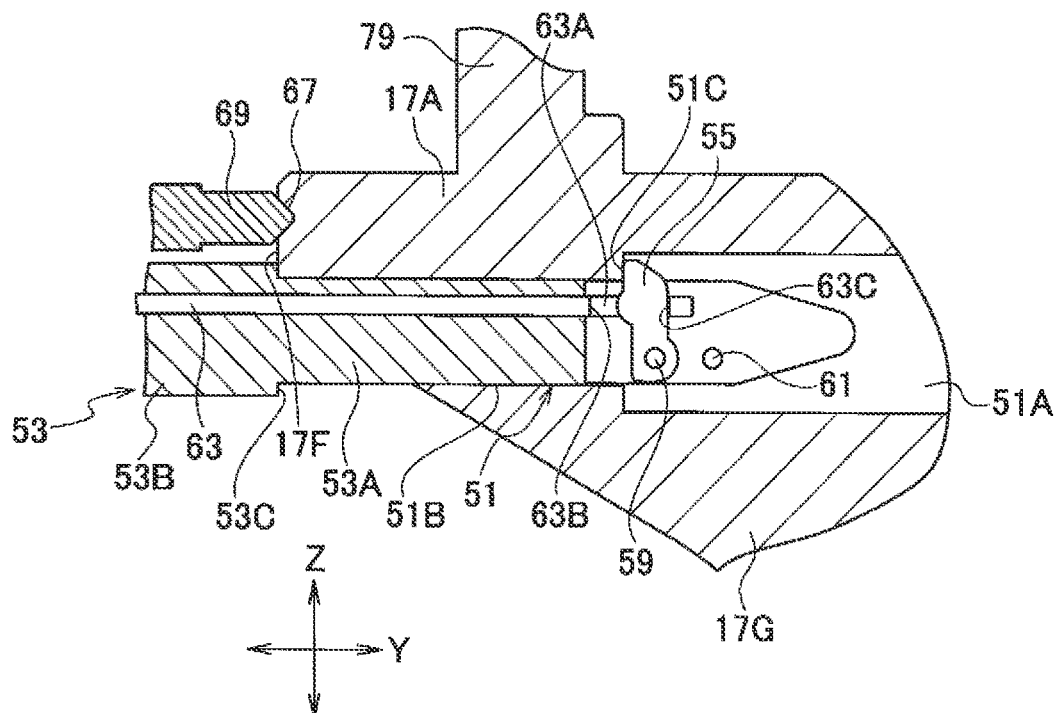
FIG. 6A is an operation explanatory view of a locking piece provided in the finger.
Figure 6B:
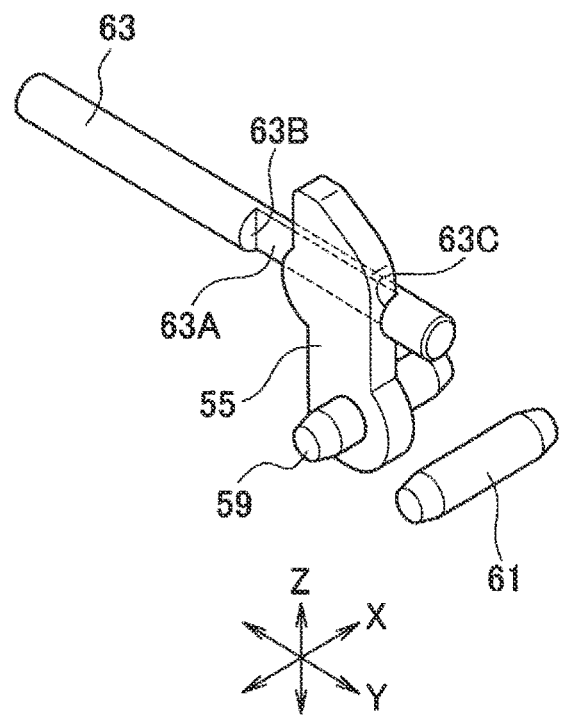
FIG. 6B is an operation explanatory view of the locking piece provided in the finger.

A tip of the operating rod 63 is provided with a cutout 63A, as illustrated in FIGS. 6A and 6B. The cutout 63A is formed with a push face 63B for performing rotating operation so as to immerse the locking piece 55 with respect to the outer circumferential surface of the finger 53. Further, in the cutout 63A, a pull face 63C for performing rotating operation so as to protrude the locking piece 55 from the outer circumferential surface of the finger 53 is formed so as to face the push face 63B. Therefore, it is possible to perform the protruding/retracting operation of the locking piece 55 with respect to the outer circumferential surface of the finger 53 by reciprocating the operating rod 63 in the longitudinal direction.

As illustrated in FIG. 5, an outer circumference of the large-diameter portion 53B of the finger 53 is provided with a slide block 65 that is movable in the longitudinal direction of the finger 53. This slide block 65 has the same function although the forms illustrated in FIGS. 2 and 4 are different. The slide block 65 is provided with a pin-shaped anti-rotation member 69 that engages with anti-rotation portions 67 provided in the divided upper tool 17, 17G to achieve anti-rotation of the divided upper tool 17, 17G.

That is, when the small-diameter portion 53A of the finger 53 is inserted into the through hole 51 in the divided upper tool 17 (17G), the stepped portion 53C of the finger 53 abuts on the front surface 17F or the back surface 17F of the divided upper tool 17 (17G). Then, the locking piece 55 and the like provided on the tip side of the small-diameter portion 53A protrudes to the outside from the through hole 51 of the small-diameter hole 51B. Therefore, the locking piece 55 can be protruded from the outer circumferential surface of the finger 53 to engage the front surface 17F or the back surface 17F of the divided upper tool 17 (17G). The anti-rotation member 69 provided on the ATC 20 is engaged with the anti-rotation portion 67 provided on the back surface or the front surface opposite to a surface engaged by the locking piece 55, so that anti-rotation of the divided upper tool 17 (17G) centered on the finger 53 can be achieved.

The anti-rotation member 69 presses the divided upper tool 17, 17G toward the locking piece 55 when the locking piece 55 is in a state of protruding from the outer circumferential surface of the finger 53. In addition, the anti-rotation member 69 clamps the divided upper tool 17, 17G in cooperation with the locking piece 55.

A hydraulic cylinder 71 is attached to the third slider 45 as illustrated in FIG. 3 in order to reciprocate the slide block 65 along the finger 53. A piston rod 71P provided in the hydraulic cylinder 71 so as to freely reciprocate is coupled to a coupling member 75. The coupling member 75 is attached to a base end of a slide rod 73 slidably supported by the supporting block 49. The slide block 65 is provided on the tip side of the slide rod 73.

Therefore, by reciprocating the hydraulic cylinder 71, the slide block 65 is reciprocated with respect to the finger 53. The anti-rotation member 69 provided in the slide block 65 is disengaged from the anti-rotation portion 67 provided in the divided upper tool 17, 17G.

A hydraulic cylinder 77 is installed to the third slider 45 in order to reciprocate the operating rod 63 in the longitudinal direction. The operating rod 63 is coupled to a piston rod 77P provided in the hydraulic cylinder 77 so as to freely reciprocate.

Therefore, the operating rod 63 can be reciprocated in the Y-axis direction (front-back direction) by reciprocating the hydraulic cylinder 77. Therefore, as described above, the locking piece 55 can be protruded from and retracted into the outer circumferential surface of the finger 53.

As is understood from the above explanation, the small-diameter portion 53A of the finger 53 provided in the ATC 20 can be inserted into the through hole 51 provided in the divided upper tool 17, 17G. As illustrated in FIG. 6A, the recessed anti-rotation portions 67 that engage with the anti-rotation member 69 provided in the ATC 20 to achieve anti-rotation are provided on the both front and back surfaces 17F of the divided upper tool 17, 17G.

Therefore, the finger 53 can be inserted into the through hole 51 of the divided upper tool 17, 17G from the front side or the back side. Then, the stepped portion 53C of the finger 53 abuts on the front and back surface 17F, and the front surface 17F or the back surface 17F of the divided upper tool 17, 17G can be engaged with the locking piece 55 provided so as to be protruded from and retracted into the outer circumferential surface of the finger 53. In addition, the anti-rotation member 69 provided in the ATC 20 can engage with the anti-rotation portion 67 provided on the back surface or the front surface opposite to a surface engaged by the locking piece 55 to prevent the divided upper tool 17, 17G from rotating around the finger 53.

That is, the small-diameter portion 53A of the finger 53 provided in the ATC 20 is inserted into the front-back directional through hole 51 provided in the divided upper tool 17, 17G, and the divided upper tool 17, 17G can be transported so as not to fall. In other words, the divided upper tool 17, 17G can be installed to and removed from the upper tool holder 15 provided in the upper table 11 of the press brake by the ATC 20.

In a case of a gooseneck tool 17G, and the finger 53 is inserted from the small-diameter hole 51B side of the through hole 51 as illustrated in FIGS. 2 and 3, the stepped portion 51C of the through hole 51 becomes an engagement face that engages with the locking piece 55, as illustrated in FIG. 6A. Then, when the finger 53 is inserted from the large-diameter hole 51A side, an outer surface provided with an outer edge (see FIG. 6A) of the small-diameter hole 51B becomes an engagement face that engages with the locking piece 55.

That is, in a case where the small-diameter portion 53A of the finger 53 is inserted into the through hole 51 from the front side or the back side of the gooseneck tool 17G, even in either case, the anti-rotation member 69 provided in the slide block 65 can engage with any of the anti-rotation portions 67 provided on both the front and back sides of the gooseneck tool 17G (FIG. 5). Therefore, even in the case of gooseneck tool 17G, the divided upper tool can be installed and removed by using the ATC 20 without rotation.

As is already understood, in the case of the gooseneck tool 17G, as illustrated in FIG. 6A, the stepped portion 51C is provided between the large-diameter hole 51A and the small-diameter hole 51B of the through hole 51. Therefore, even in a case where the thickness of the thick portion 17A of the gooseneck tool 17G is large, easy installation and remove is possible.

As is understood from the above explanation, the divided upper tool 17, 17G can be installed to and removed from the upper tool holder 15 by using the ATC 20. The divided upper tool 17, 17G is provided with the circular through hole 51, into which the small-diameter portion 53A of the finger 53 of the ATC 20 is inserted, at the central portion in the lateral direction (left-right direction) of the thick portion 17A provided close to an attachment portion 79 provided on an upper part of the divided upper tool 17, 17G. Therefore, the configuration of the divided upper tool 17, 17G can be simplified, and the vertical dimension can be reduced as compared with a case of a vertically long hole. Further, since the through hole 51 is a circular hole, it is easy to work the through hole 51.

In order to install the divided upper tool 17, 17G stored in the tool storage 19 to the upper tool holder 15 provided in the upper table 11 of the press brake 1 by the ATC 20, the ATC 20 is provided so as to freely reciprocate between the back position of the upper tool holder 15 and the tool storage 19.

The overall configuration of the tool storage 19 is almost the same as the configuration of the tool storage device described in, for example, Patent Literature 2. In Patent Literature 2, upper and lower tool changers are provided movably in the left-right direction along left-right directional guide rails provided in the upper and lower tables of the press brake. Patent Literature 2 describes tool exchange between the press brake and the tool changers by the upper and lower tool changers. That is, it is known to exchange tools between the press brake and the tool storage device.

This embodiment relates to the installation of the divided upper tool 17 to the upper tool holder 15. Therefore, a case where the divided upper tool 17 is installed to the upper tool holder 15 will be described. For example, the configuration described in Patent Literature may be applied to the configuration of performing the installation of the divided lower tool 7 to the lower tool installing portion 9. Therefore, the description of the configuration of a case where the divided lower tool 7 is installed to the lower tool installing portion 9 will be omitted.

In order to install the divided upper tool 17 stored in the tool storage 19 to the upper tool holder 15 provided in the press brake 1, the ATC 20 is provided to freely reciprocate between the press brake 1 and the tool storage 19.

That is, the guide rail 21, the beam member 25, the rack 27, and the like that guide the ATC 20 in the left-right direction are supported by an extending frame 81 (see FIG. 1) that extends from the side of the press brake 1 toward the tool storage. This extending frame 81 corresponds to a guide rail extension portion described in Patent Literature 2.

The tool storage 19 functions in the same manner as the tool storage device described in Patent Literature 2. Therefore, roughly speaking, the tool storage 19 includes a stocker transport device 85 that lifts a desired stocker main body 83 stored in the tool storage 19 and transports the stocker main body to a predetermined position (position aligned with the upper tool holder 15 in the left-right direction (X-axis direction)) in front of the extending frame 81.

The stocker transport device 85 corresponds to the upper tool holder transporting means (denoted by reference numeral 51) described in Patent Literature 2, and has the same function. That is, the stocker transport device 85 has a function of transporting and positioning the stocker main body 83 to a tool exchange position 19A corresponding to the ATC 20 that moves to the tool storage 19 side, and a function of vertically moving the stocker main body 83 with respect to the ATC 20.

Figure 7:
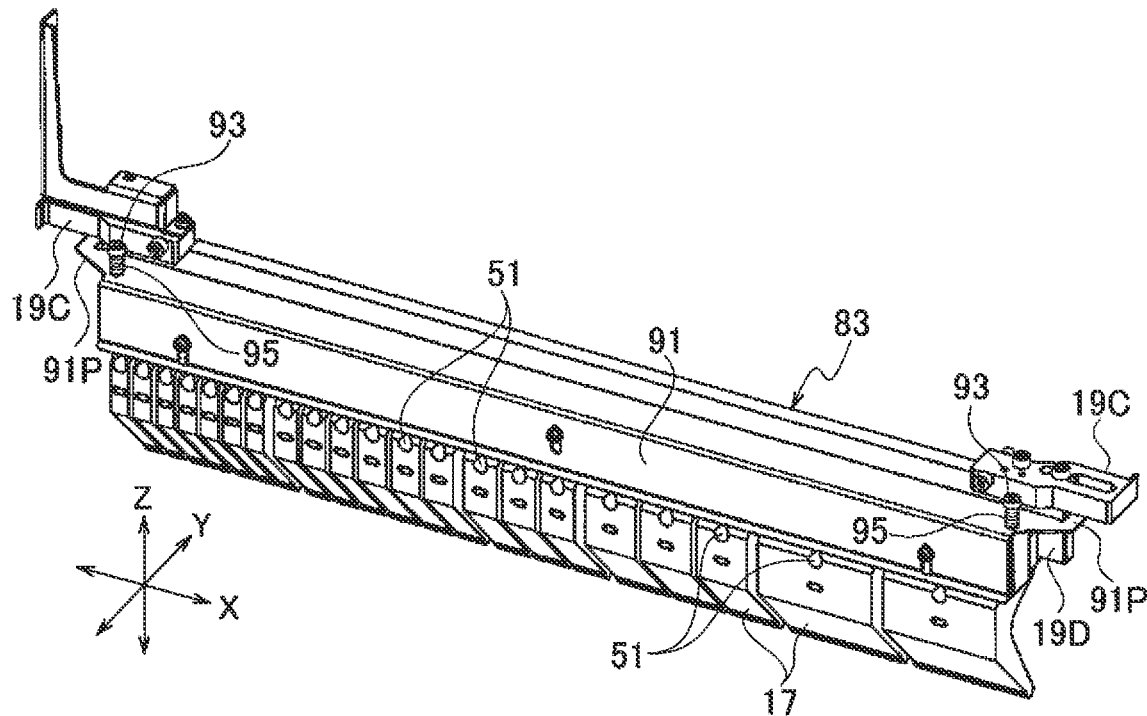
FIG. 7 is a perspective explanatory view of a stocker main body that supports a plurality of divided upper tools.
Figure 8:
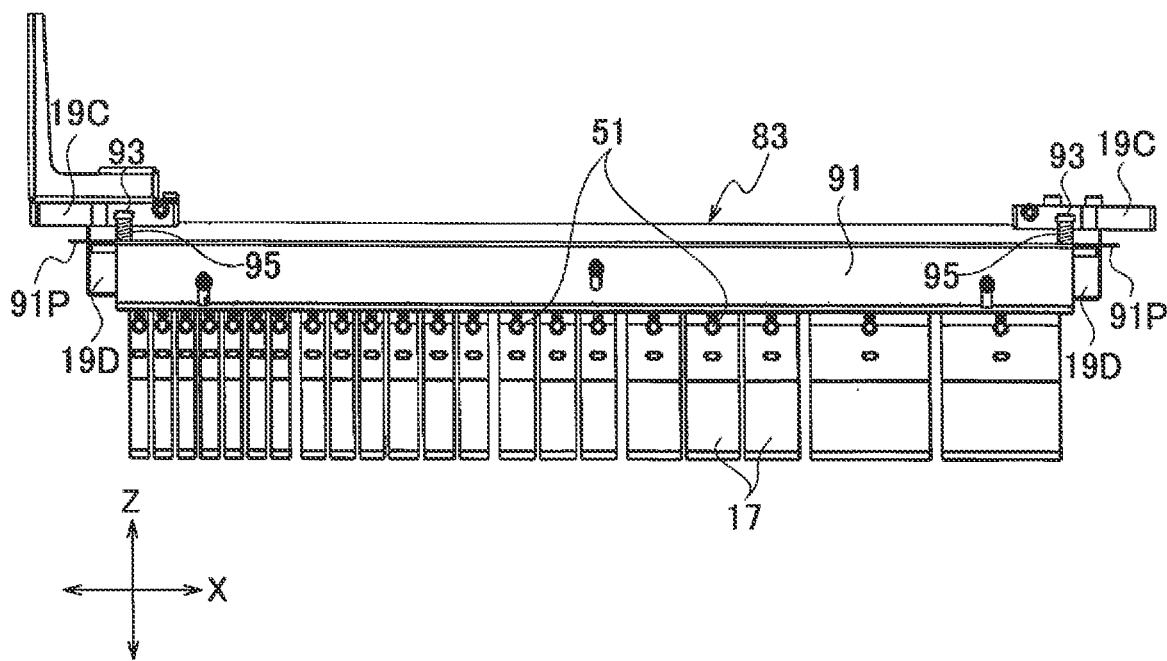
FIG. 8 is an explanatory front view of the stocker main body that supports the plurality of divided upper tools.

As illustrated in FIGS. 7 and 8, the stocker main body 83 is configured long in the X-axis direction (left-right direction). Brackets 19C (see FIGS. 7 and 8) supported by left and right support members 19B (see FIG. 12) provided at the tool exchange position 19A are provided on both left and right ends so as to protrude in the left-right direction when the stocker main body 83 is installed (positioned) at the tool exchange position 19A of the tool storage 19. Vertical guide plates 19D are provided on the lower sides of the brackets 19C. The guide plates 19D are sandwiched by a plurality of front and back guide rollers 19F provided in brackets 19E provided at the tool exchange position 19A, and guided vertically.

Figure 9:
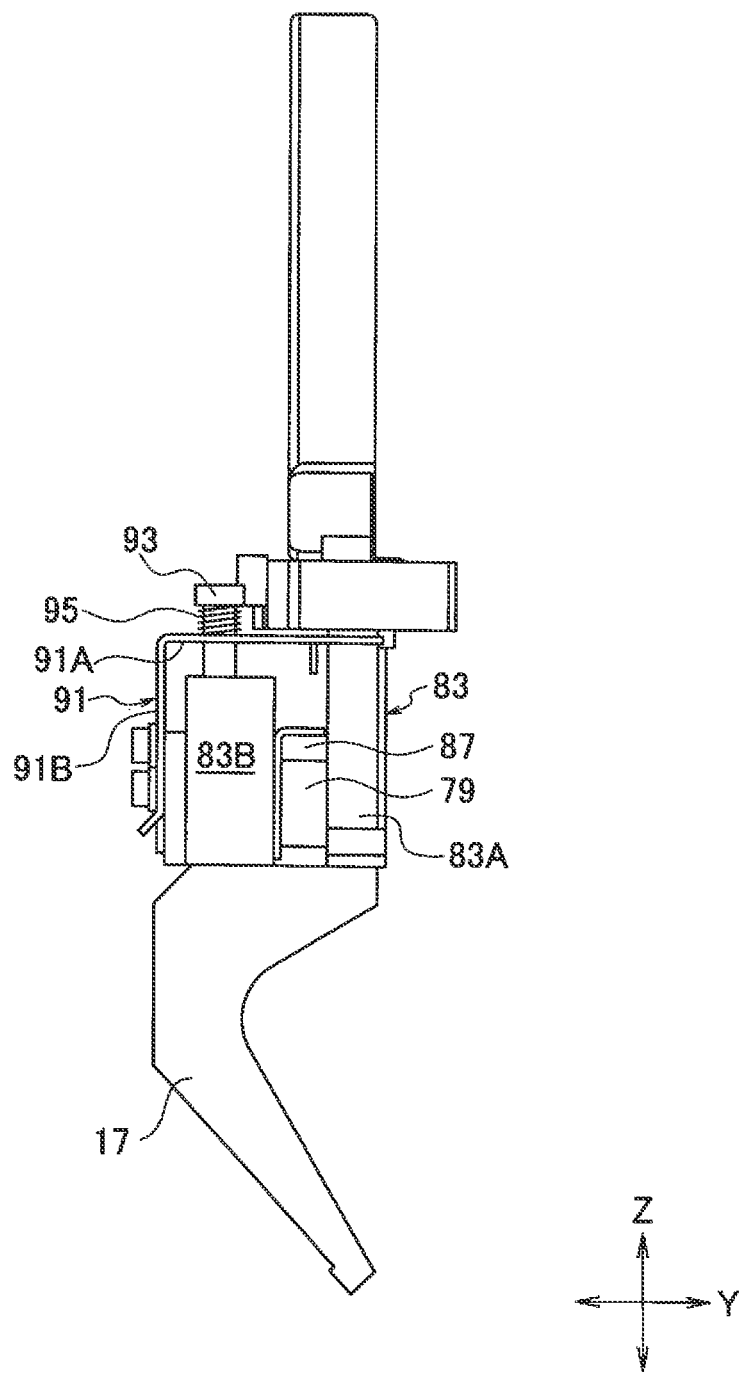
FIG. 9 is an explanatory side view of a state in which the divided upper tool is supported by the stocker main body.
Figure 10:
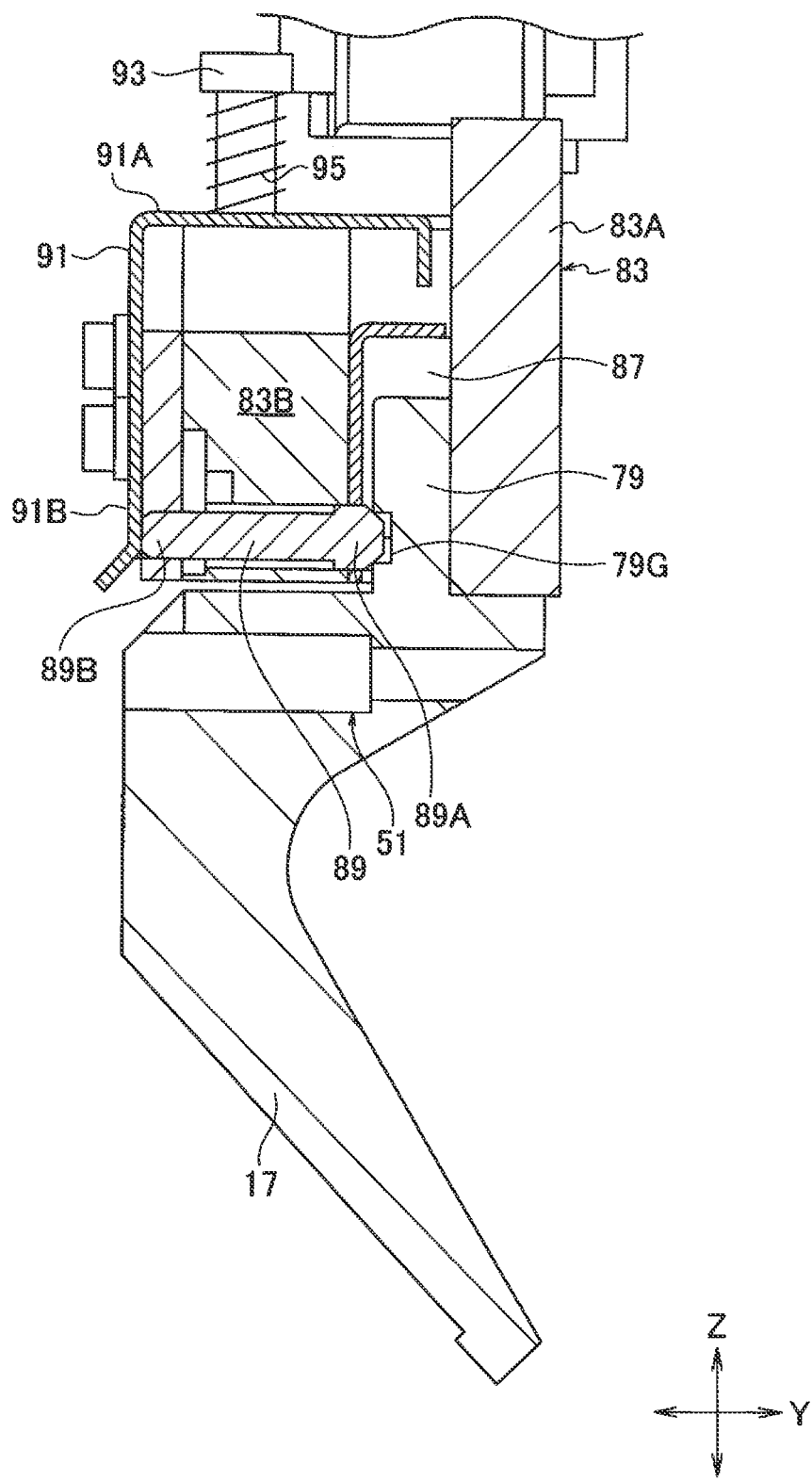
FIG. 10 is an explanatory side view of a state in which the divided upper tool supported by the stocker main body is fixed.
Figure 11:
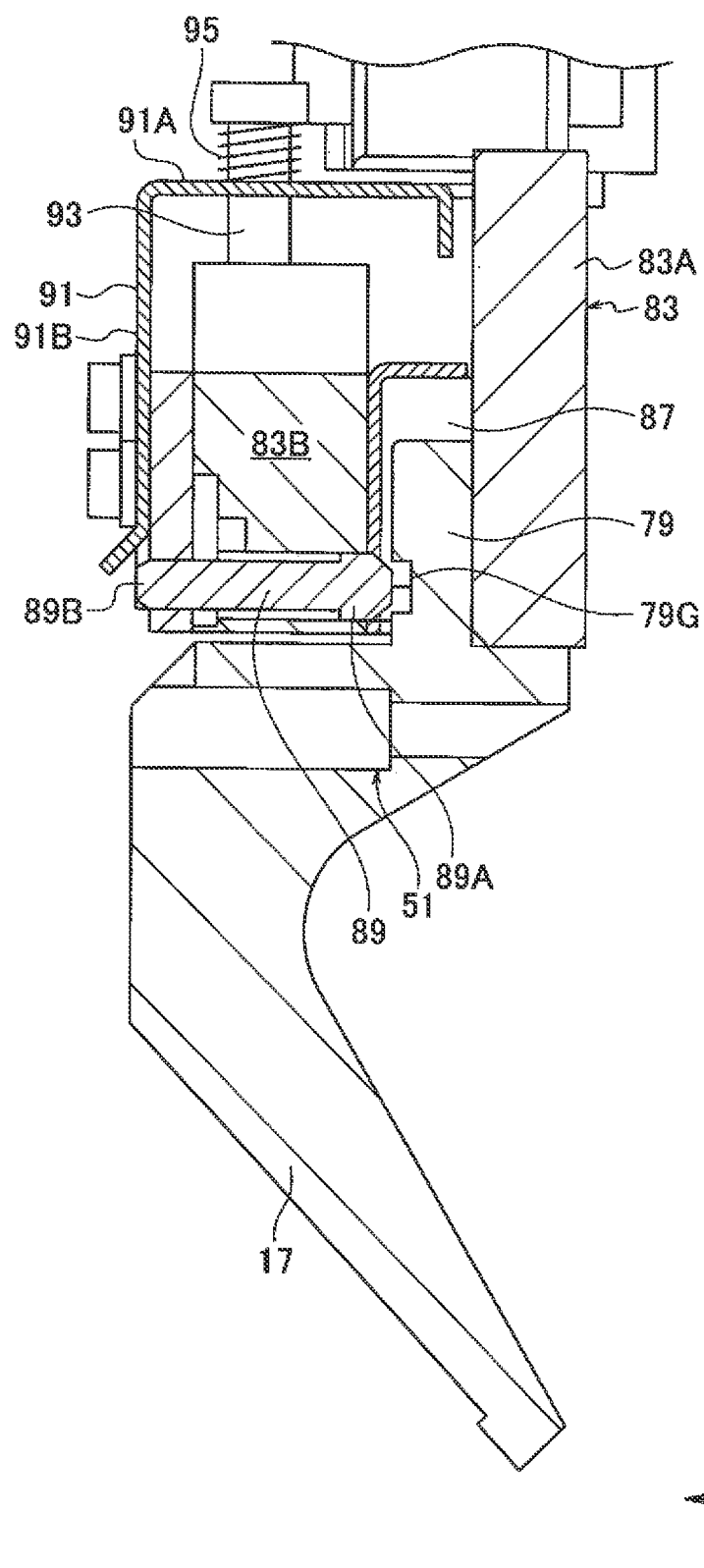
FIG. 11 is an explanatory side view of a state in which the fixing of the divided upper tool supported by the stocker main body is released.

The stocker main body 83 is provided with an installing groove 87 (see FIG. 10 and FIG. 11) that extends in the left-right direction (X-axis direction) and allows the attachment portion 79 (see FIG. 9) of the divided upper tool 17 to be detachably installed. The installing groove 87 is configured to open downward. In the stocker main body 83, a plurality of locking pieces 89 each having a tip 89A freely engageable with and disengageable from a left-right directional anti-drop groove 79G formed in the attachment portion 79 of the divided upper tool 17 installed to the installing groove 87 are provided so as to be movable horizontally and in the Y-axis direction.

More specifically, the stocker main body 83 extending in the left-right direction is provided with a second beam member 83B in parallel with and integrally with a first beam member 83A, so that the installing groove 87 is formed along the left-right direction (X-axis direction) between the first beam member 83A and the second beam member 83B. The plurality of locking pieces 89 are disposed at appropriate intervals in the X-axis direction in the second beam member 83B. Each locking piece 89 is configured to be slidable along the Y-axis direction.

The tip 89A of each locking piece 89 is formed, for example, in a hemispherical shape or a tapered shape so as to be easily engaged with and disengaged from the anti-drop groove 79G. A base end 89B of each locking piece 89 is provided so as to be able to protrude outward from the second beam member 83B of the stocker main body 83. The stocker main body 83 is provided with a shutter 91 that simultaneously presses respective base ends 89B of the locking pieces 89 in the inward direction of the installing groove 87. The base end 89B of each locking piece 89 is pressed by the shutter 91, so that the tip 89A of each locking piece 89 can be engaged with the anti-drop groove 79G of the divided upper tool 17.

More specifically, the shutter 91 is guided and supported by vertical guide members 93 provided in the stocker main body 83 so as to be movable vertically. This shutter 91 is formed long in the left-right direction, and is configured to have an L-shaped cross section with a horizontal portion 91A vertically guided by the guide members 93, and a vertical locking piece pressing portion (vertical portion) 91B that can press the base end 89B of each locking piece 89. The shutter 91 is always urged downward by urging members 95 such as coil springs provided in the guide members 93.

Therefore, the base end 89B of each locking piece 89 is always pressed by the vertical portion (pressing portion) 91B of the shutter 91. In other words, the shutter 91 can regulate the movement of each locking piece 89 at the same time. In addition, the shutter 91 is always urged downward by the urging member 95, and therefore holds a closed state in which the movement of each locking piece 89 is regulated. Accordingly, the tip 89A of each locking piece 89 engages with the anti-drop groove 79G provided in the attachment portion 79 of the divided upper tool 17 to prevent the divided upper tool 17 from dropping.

Figure 12:
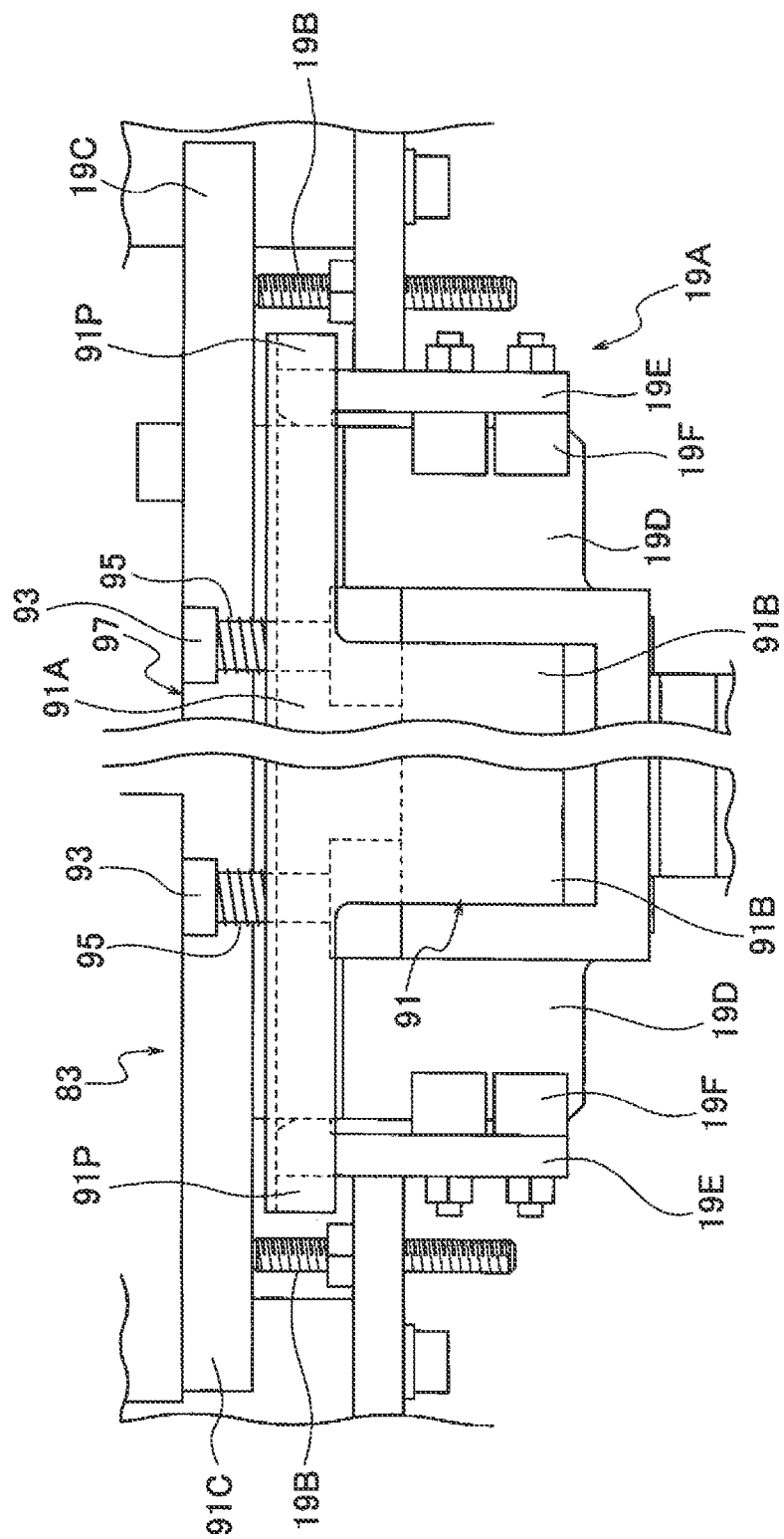
FIG. 12 is an explanatory diagram of a configuration in which a shutter provided in the stocker main body is opened.

In order to release the pressing of each locking piece 89 by the vertical portion 91B of the shutter 91, protrusions 91P (see FIGS. 7 and 8) protruding in the left-right direction are provided on both the left and right ends of the shutter 91. The protrusions 91P are provided so as to protrude in the left-right direction with respect to the guide plates 19D provided in the stocker main body 83. Therefore, when the stocker main body 83 is installed at the tool exchange position 19A, the protrusions 91P are lifted relatively by the brackets 19E as illustrated in FIG. 12.

Accordingly, the shutter 91 is relatively raised against the urging force of the urging members 95. Therefore, the pressing of each locking piece 89 by the vertical portion 91B of the shutter 91 is released at the same time. In other words, the shutter 91 can release the movement regulation of each locking piece 89 at the same time. Therefore, by moving the divided upper tool 17 downward relative to the stocker main body 83, the pressing by the locking piece 89 is released, and the divided upper tool 17 can be removed relatively downward from the stocker main body 83.

In a case where the divided upper tool 17 is installed to the stocker main body 83, when the pressing of the locking piece 89 by the shutter 91 is released, the attachment portion 79 of the divided upper tool 17 is inserted and positioned in the installing groove 87. When the stocker main body 83 is relatively raised in order to press the base end 89B of each locking piece 89 by the vertical portion 91B of the shutter 91, the shutter 91 is lowered relative to the stocker main body 83 by the urging force of the urging member 95. Therefore, the tip 89A of the locking piece 89 engages with the anti-drop groove 79G of the divided upper tool 17 to prevent the divided upper tool 17 from dropping.

Each locking piece 89 is pressed and urged in the direction of the installing groove 87 by an elastic member (not illustrated) such as a coil spring. When the divided upper tool 17 is removed downward, the tip 89A of each locking piece 89 is pressed against the urging force of the elastic member. In this case, a configuration is also possible in which the attachment portion 79 of the divided upper tool 17 can be held by the installing groove 87 by, for example, a click mechanism.

As is understood from the above explanation, according to this embodiment, the divided upper tool 17 that is manually installed to and removed from the upper tool holder 15 is provided with a circular through hole 51 into which the finger 53 of the ATC 20 can be inserted. Therefore, the divided upper tool 17 can be manually installed to and removed from the upper tool holder 15. In addition, the divided upper tool 17 can be installed and removed by using the ATC 20. The stocker main body 83 can detachably support the divided upper tool 17. Therefore, the versatility of installing and removing of the divided upper tool 17 to and from the upper tool holder 15 is improved.

Figure 13:
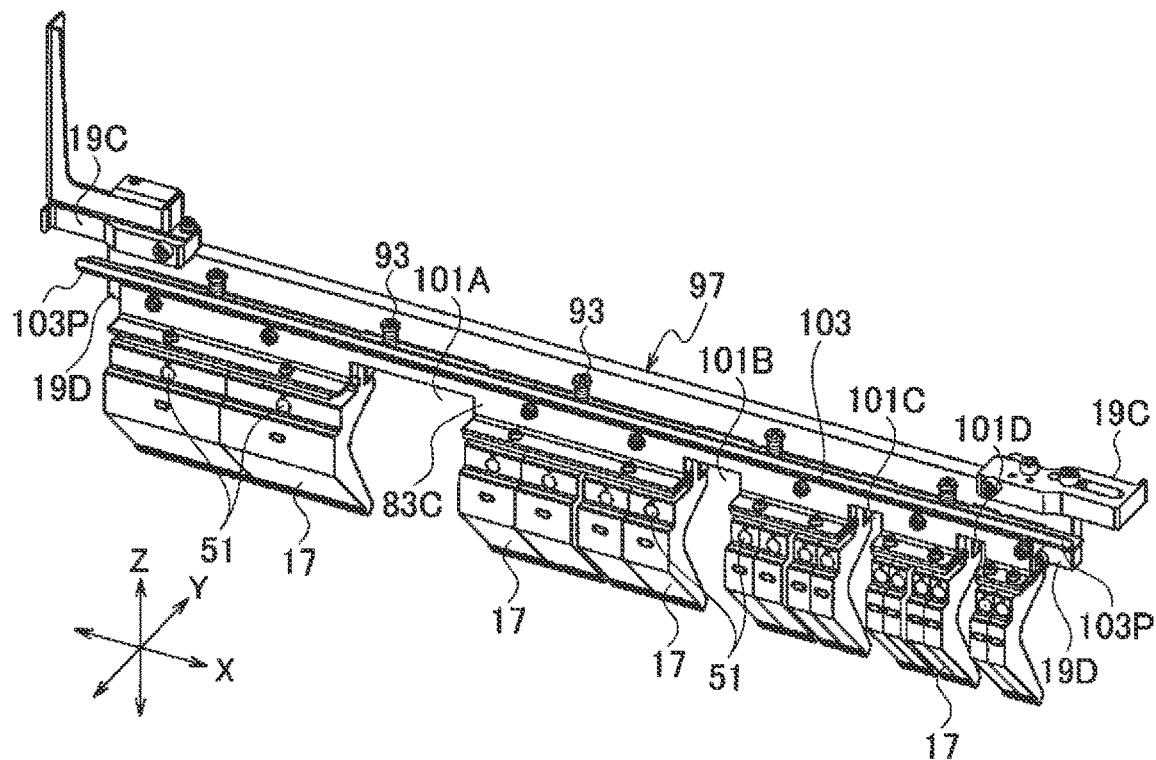
FIG. 13 is a perspective explanatory view of a stocker main body according to a second embodiment.

FIG. 13 is a perspective view of a stocker main body 97 according to a second embodiment. In a configuration according to this second embodiment, the components having the same functions as those described above are denoted by the same reference numerals, and duplicate explanations will be omitted.

In this second embodiment, an installing groove 87 (see FIGS. 15 and 16) provided in the stocker main body 97 is formed between a first beam member 83A and a second beam member 83C having an L-shaped cross section and integrally provided with the first beam member 83A. The second beam member 83C is attached to a ceiling member 83D (see FIG. 15) integrally attached to the first beam member 83A. Therefore, the installing groove 87 has a configuration in which the first beam member 83A, the second beam member 83C, and the ceiling member 83D close the three directions. An anti-drop plate 99 that is long in the X-axis direction is provided in a lower portion of the second beam member 83C. This anti-drop plate 99 has a function of engaging with an anti-drop groove 79G formed in an attachment portion 73 of a divided upper tool 17 to prevent the divided upper tool 17 from dropping from the installing groove 87.

Figure 14:
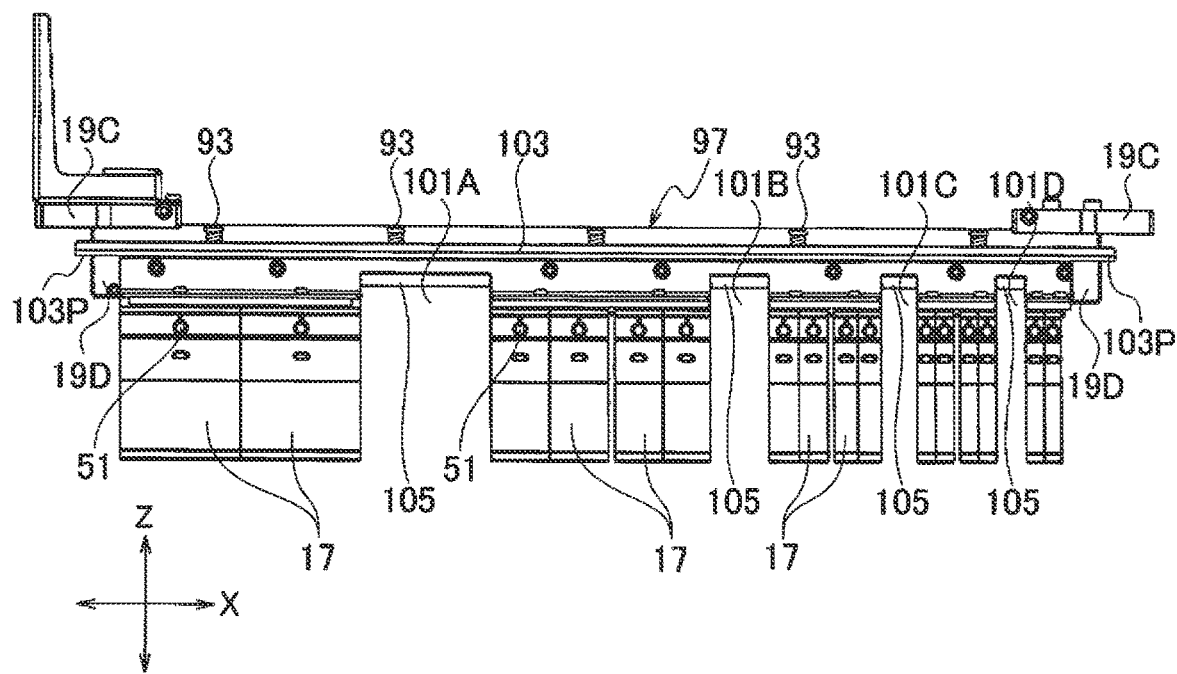
FIG. 14 is an explanatory front view of the stocker main body according to the second embodiment.

In order to remove each divided upper tool 17 to and from the installing groove 87 of the stocker main body 97 downward or in the front-back direction, a plurality of front-back directional cutouts 101A to 101D (see FIGS. 13 and 14) that communicate with the installing groove 87 are formed at appropriate intervals in the first beam member 83A, the third beam member 83C and the anti-drop plate 99. The cutouts 101A to 101D each have a size corresponding to the left-right directional width dimension of the respective divided upper tool 17 installed in proximity to other divided upper tools 17 in the stocker main body 97. The cutouts 101A to 101D include a first cutout 101A, a second cutout 101B, a third cutout 101C, and a fourth cutout 101D.

Therefore, each divided upper tool 17 installed to the stocker main body 97 is moved in the left-right direction to any of positions of cutouts 101A to 101D of the corresponding sizes, so that the anti-drop groove 79G is disengaged from the anti-drop plate 99, and the divided upper tool 17 can be removed from the stocker main body 97 downward or in the front-back direction.

In a case where the front-back directional cutouts 101A to 101D are formed only in the first beam member 83A located on the back side, in the stocker main body 97, each divided upper tool 17 can be installed to and removed from the stocker main body 97 from the back side. In addition, in a case where the vertical cutouts 101A to 101D are formed only on the anti-drop plate 99, each divided upper tool 17 can be installed to and removed from the stocker main body 97 in the vertical direction.

Each divided upper tool 17 installed to (supported by) the stocker main body 97 needs to be prevented from accidentally moving to the position of any of cutouts 101A to 101D to be dropped. Therefore, the stocker main body 97 includes a shutter 103 that can regulate the movement of the divided upper tools 17 to the cutouts 101A to 101D.

Figure 15:
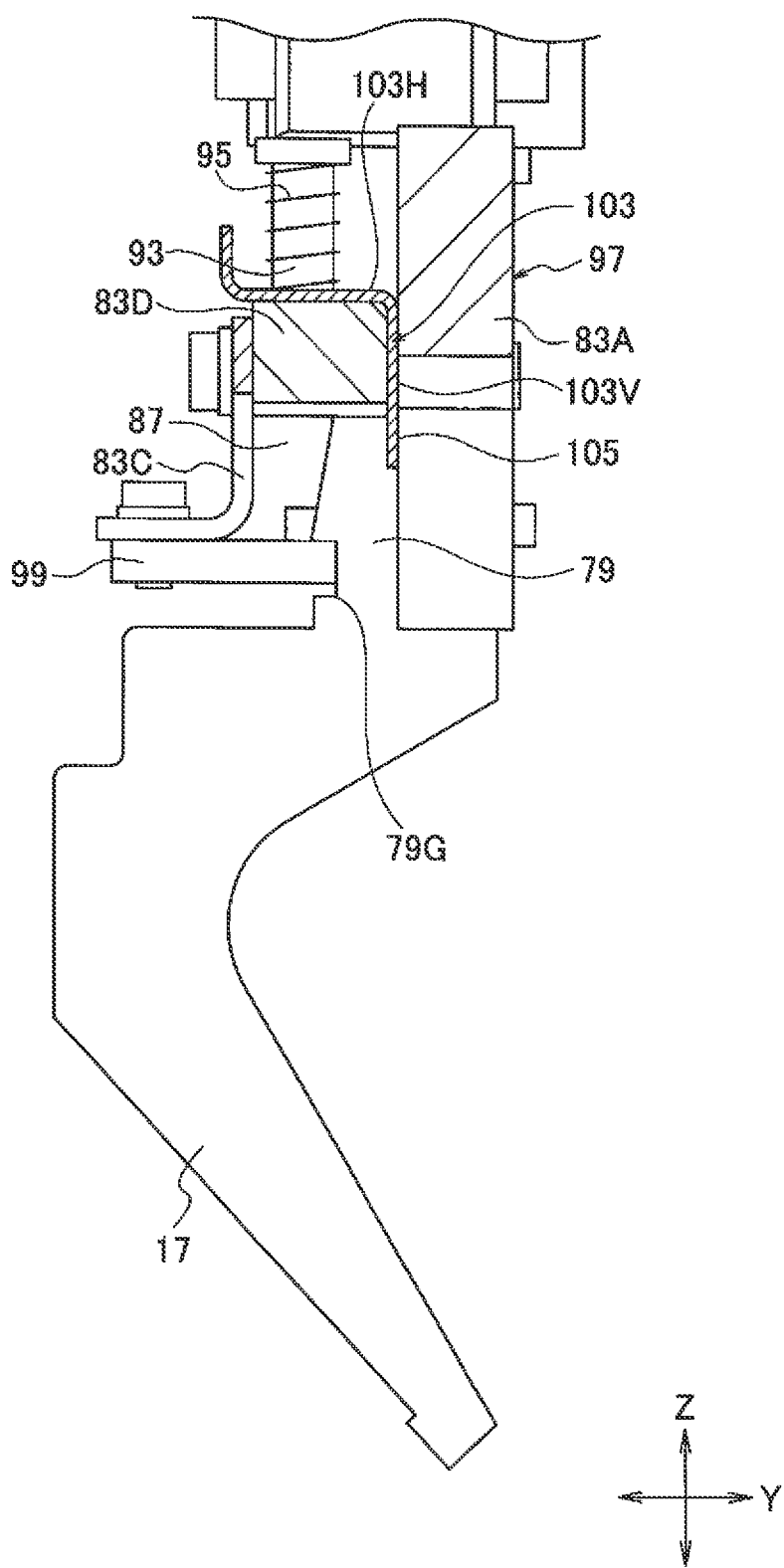
FIG. 15 is an explanatory side view of a state in which the divided upper tool supported by the stocker main body is fixed.
Figure 16:
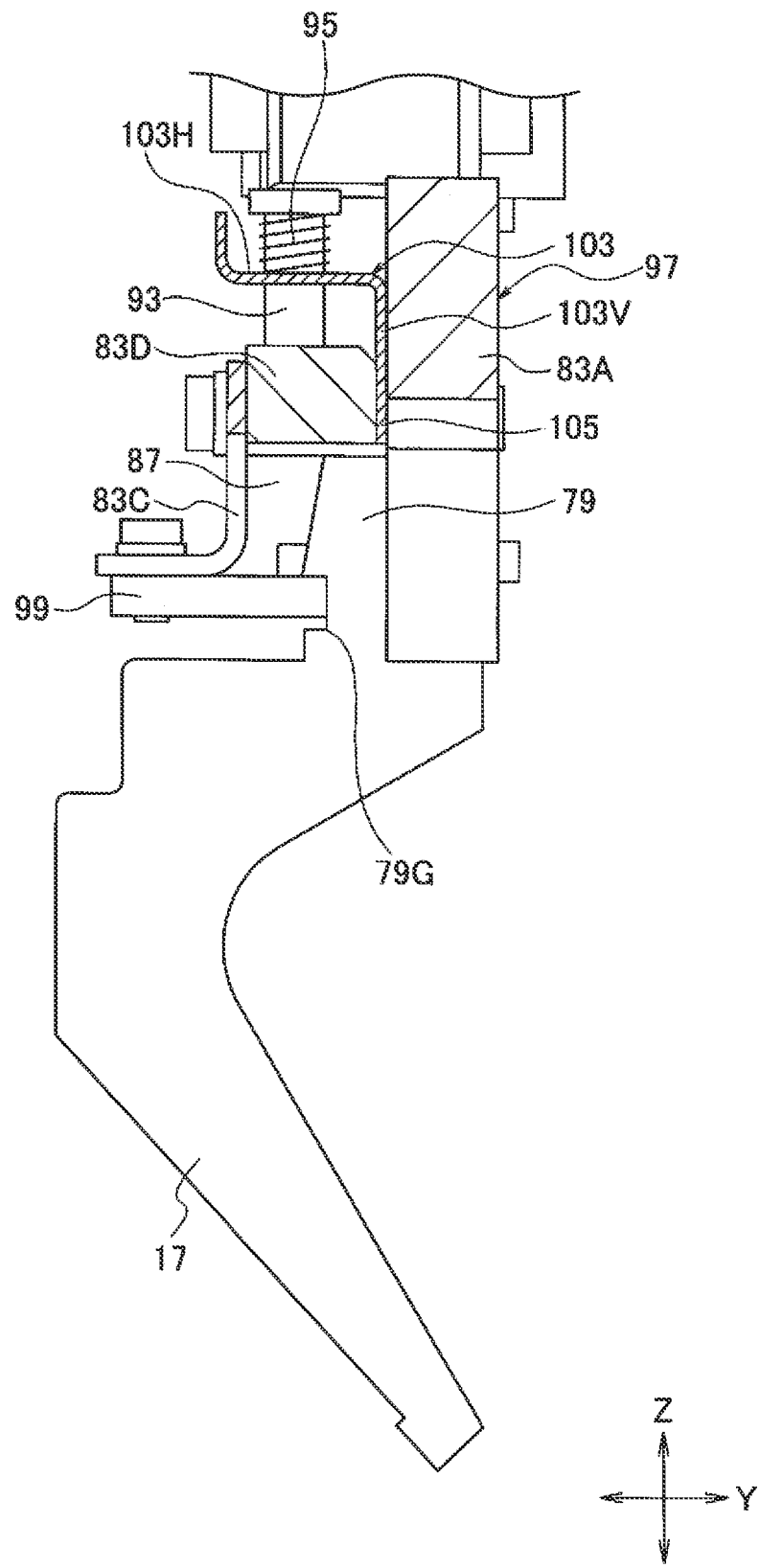
FIG. 16 is an explanatory side view of a state in which the fixing of the divided upper tool supported by the stocker main body is released.

As illustrated in FIGS. 15 and 16, the shutter 103 is formed in a Z shape including a horizontal portion 103H and a vertical portion 103V in side view. The horizontal portion 103H is guided so as to be movable vertically by a guide member 93 erected on the ceiling member 83D. The horizontal portion 103H is always urged downward by urging members 95 such as coil springs elastically mounted between heads of the guide members 93 and the horizontal portion. A stopper portion 105 that can regulate the movement of the divided upper tool 17 from the inside of the installing groove 87 to each of the cutouts 101A to 101D is provided at the position corresponding to each of the cutouts 101A to 101D in the vertical portion 103V of the shutter 103.

The stopper portion 105 can open and close the cutouts 101A to 101D, and in a normal state, the cutouts 101A to 101D are held in a closed state (see FIG. 15). Therefore, in the normal state, when the divided upper tool 17 tends to move from the installing groove 87 to the position of each of the cutouts 101A to 101D, the attachment portion 79 of the divided upper tool 17 comes into contact with the stopper portion 105 located at the each of the cutouts 101A to 101D, and the divided upper tool 17 is prevented from moving to each of the cutouts 101A to 101D.

The stocker main body 97 is transported by the stocker transport device 85 provided in the tool storage 19, and positioned (installed) at a tool exchange position 19A. Consequently, protrusions 103P provided on both the left and right end sides of the shutter 103 so as to protrude in the left-right direction are supported by the bracket 19E at the tool exchange position 19A. The shutter 103 is relatively lifted against the urging force of the urging members 95, and the shutter 103 is opened. Therefore, the stopper portion 105 in the shutter 103 is pulled upward from each of the cutouts 101A to 101D (see FIG. 16). Accordingly, at the tool exchange position 19A, the divided upper tool 17 can be moved laterally (moved in the X-axis direction) from the installing groove 87 to the position of each of the cutouts 101A to 101D to be removed in the front-back direction or downward.

In a case where the plurality of divided upper tools 17 installed to the stocker main body 97 are removed for exchange by using the ATC 20, the divided upper tools 17 can be removed from the cutouts 101A to 101D by moving the divided upper tools 17 to the positions of the cutouts 101A to 101D along the installing groove 87. Therefore, when each divided upper tool 17 is installed to and removed from the stocker main body 97, a lateral movement distance along the installing groove provided in the stocker main body 97 is shortened. Accordingly, the divided upper tool 17 can be promptly and effectively installed to and removed from the stocker main body 97.

As is understood from the above explanation, the stocker main body according to the embodiment includes the shutter that prevents the plurality of divided upper tools detachably provided in the stocker main body from dropping. Therefore, the divided upper tools can be prevented from accidentally dropping when the stocker main body is moved, and safety is improved.

The disclosures of this application are relevant to the subject matter described in Japanese Patent Application No. 2018-134168 filed on Jul. 17, 2018, Japanese Patent Application No. 2019-111277 filed on Jun. 14, 2019, Japanese Patent Application No. 2018-140886 filed on Jul. 27, 2018, Japanese Patent Application No. 2019-109717 filed on Jun. 12, 2019, Japanese Patent Application No. 2018-134151 filed on Jul. 17, 2018, Japanese Patent Application No. 2018-169366 filed on Sep. 11, 2018, Japanese Patent Application No. 2019-126935 filed on Jul. 8, 2019, Japanese Patent Application No. 2019-087437 filed on May 7, 2019, and Japanese Patent Application No. 2019-092892 filed on May 16, 2019, all disclosures of which are incorporated herein by reference.

The invention claimed is:

1. An upper tool stocker configured to be stored in a tool storage that is positionable adjacent a press brake, and the upper tool stocker providing for detachably supporting a plurality of upper tools to be installed and removed from the press brake, the upper tool stocker comprising:
   a stocker main body having a longitudinal axis that extends in a horizontal first direction, and the stocker main body being provided with an installing groove formed by two beam members and a ceiling member, the installing groove having a longitudinal axis that extends in the horizontal first direction,
   wherein a respective attachment portion provided in each respective upper portion of each of the plurality of upper tools is detachably installed in the installing groove,
   wherein the stocker main body comprises a plurality of cutouts communicated with the installing groove, the plurality of cutouts comprising a first cutout and a second cutout that are coaxial with one another in the horizontal first direction and that are separated from one another in the horizontal first direction, wherein the installing groove comprises a plurality of installing groove sections that are coaxial with one another in the horizontal first direction, wherein each of the plurality of cutouts completely penetrates and extends through the stocker main body in a horizontal second direction, the horizontal second direction extending perpendicular to the horizontal first direction, and wherein in the horizontal first direction each of the plurality of cutouts separates two respective adjacent installing groove sections of the plurality of installing grooves sections, each two respective adjacent installing groove sections being connected by a respective portion of the ceiling member, wherein each of the plurality of cutouts is a respective opening that provides clearance for removal of corresponding ones of the plurality of upper tools from the installing groove, and after sliding the corresponding ones of the plurality of upper tools in the horizontal first direction into the corresponding cutout of the plurality of cutouts, the corresponding ones of the plurality of upper tools can be removed from the corresponding cutout by being moved in the horizontal second direction or by being moved downward in a vertical third direction.

2. The upper tool stocker according to claim 1, wherein the plurality of cutouts are provided along the longitudinal axis of the stocker main body, and the plurality of cutouts are each formed to have a respective size corresponding to a width dimension of a respective upper tool installed in proximity to other upper tools of the plurality of upper tools in the stocker main body.

3. The upper tool stocker according to claim 1, wherein the stocker main body is provided with a shutter configured to regulate movement of each of the plurality of upper tools from the installing groove to a position of a corresponding one of the plurality of cutouts.

4. The upper tool stocker according to claim 3, wherein the upper tool stocker is configured to be positioned at a tool exchange position, and the shutter is configured to be opened when the stocker main body is positioned at the tool exchange position.

5. The upper tool stocker according to claim 1, wherein the stocker main body further includes an anti-drop plate extending in the horizontal first direction and provided in a lower portion of the installing groove, wherein the anti-drop plate is configured to engage with the respective attachment portion of each of the plurality of upper tools to prevent the plurality of upper tools from dropping from the installing groove, and the plurality of cutouts are formed at intervals in the anti-drop plate.

6. The upper tool stocker according to claim 1, wherein the two beam members comprise a first beam member and a second beam member, and the installing groove is formed between the first beam member extending in the horizontal first direction and the second beam member integrally provided with the first beam member, and the plurality of cutouts are formed at intervals in the first beam member and in the second beam member, and the plurality of cutouts penetrate the first beam member and the second beam member in the horizontal second direction.

7. The upper tool stocker according to claim 1, wherein the plurality of cutouts further comprises a third cutout, wherein the third cutout is coaxial with the first cutout and the second cutout, and the third cutout is separated from the first cutout and the second cutout in the horizontal first direction.

8. The upper tool stocker according to claim 7, wherein the plurality of cutouts further comprises a fourth cutout, wherein the fourth cutout is coaxial with the first cutout, the second cutout, and the third cutout, and the fourth cutout is separated from the first cutout, the second cutout, and the third cutout in the horizontal first direction.

* * * * *